(12) United States Patent
Lin et al.

(10) Patent No.: US 12,416,367 B2
(45) Date of Patent: Sep. 16, 2025

(54) INTEGRATED MULTI-WAY SOLENOID VALVE AND VEHICLE THERMAL MANAGEMENT SYSTEM

(71) Applicants: Zhejiang Geely Holding Group Co., Ltd, Zhejiang (CN); GEELY AUTOMOBILE RESEARCH INSTITUTE (NINGBO) CO., LTD, Zhejiang (CN)

(72) Inventors: Bingrong Lin, Zhejiang (CN); Junbo Xu, Zhejiang (CN); Guibin Li, Zhejiang (CN); Qiang Xue, Zhejiang (CN); Haijiang Dai, Zhejiang (CN)

(73) Assignees: ZHEJIANG GEELY HOLDING GROUP CO., LTD, Zhejiang (CN); GEELY AUTOMOBILE RESEARCH INSTITUTE (NINGBO) CO., LTD, Zhejiang (CN)

( * ) Notice: Subject to any disclaimer, the term of this patent is extended or adjusted under 35 U.S.C. 154(b) by 208 days.

(21) Appl. No.: 18/340,860

(22) Filed: Jun. 24, 2023

(65) Prior Publication Data
US 2023/0332699 A1    Oct. 19, 2023

Related U.S. Application Data

(63) Continuation of application No. PCT/CN2021/076473, filed on Feb. 10, 2021.

(51) Int. Cl.
   *F16K 11/085* (2006.01)
   *F16K 27/06* (2006.01)
   (Continued)

(52) U.S. Cl.
   CPC ........ *F16K 11/0856* (2013.01); *F16K 31/043* (2013.01); *F16K 31/535* (2013.01);
   (Continued)

(58) Field of Classification Search
   CPC ............... F16K 11/085; F16K 11/0853; F16K 11/0856; F16K 27/065; F16K 27/12;
   (Continued)

(56) References Cited

U.S. PATENT DOCUMENTS

| | | | | |
|---|---|---|---|---|
| 2,592,371 A | * | 4/1952 | Ackroyd ................... | F16K 5/10 |
| | | | | 137/625.18 |
| 3,052,263 A | * | 9/1962 | Gordon ............... | F16K 11/0856 |
| | | | | 137/625.24 |

(Continued)

FOREIGN PATENT DOCUMENTS

| | | |
|---|---|---|
| CN | 2326793 Y | 6/1999 |
| CN | 106224595 A | 12/2016 |

(Continued)

OTHER PUBLICATIONS

Extended European Search Report from corresponding European Application No. EP21925214.5, dated Dec. 22, 2023.

(Continued)

*Primary Examiner* — Kenneth Rinehart
*Assistant Examiner* — Jonathan J Waddy

(57) ABSTRACT

An integrated multi-way valve includes: a mounting panel, N channel interfaces being defined on the mounting panel; a valve seat fixedly connected to the mounting panel, N openings being defined on the cylindrical valve seat and in communication with N channel interfaces correspondingly; a valve cartridge disposed in the valve seat in a close engagement manner with the valve seat, a plurality of communication grooves being defined on a circumferential surface of the valve cartridge; and a driving assembly in transmission connection with the valve cartridge and configured to drive the valve cartridge to rotate by a predetermined angle to bring at least one target communication groove of the plurality of communication grooves into communication with a plurality of target openings of the N (Continued)

openings. Each of the at least one target communication groove is in communication with at least two of the plurality of target openings.

17 Claims, 6 Drawing Sheets

(51) Int. Cl.
  *F16K 31/04* (2006.01)
  *F16K 31/53* (2006.01)
  *F16K 37/00* (2006.01)
(52) U.S. Cl.
  CPC ........ *F16K 37/0058* (2013.01); *F16K 27/065* (2013.01); *Y10T 137/8275* (2015.04); *Y10T 137/86871* (2015.04)
(58) Field of Classification Search
  CPC .. F16K 31/043; F16K 31/535; F16K 37/0008; F16K 37/0058; F16K 37/0016; Y10T 137/8275; Y10T 137/86871
  USPC ........................ 137/625.19, 625.47
  See application file for complete search history.

(56) References Cited

U.S. PATENT DOCUMENTS

| | | | | |
|---|---|---|---|---|
| 4,285,365 | A * | 8/1981 | Coats | F16K 11/0856 137/625.15 |
| 4,593,717 | A * | 6/1986 | Levasseur | F16K 37/0008 251/297 |
| 4,658,859 | A * | 4/1987 | Backe | F16K 11/0856 137/625.22 |
| 6,206,029 | B1 * | 3/2001 | Onodera | F16K 31/041 251/248 |
| 7,690,397 | B2 * | 4/2010 | Hollis | F16K 11/076 251/310 |
| 2002/0079003 | A1 * | 6/2002 | Scampini | F16K 5/0407 137/625.32 |
| 2007/0107787 | A1 * | 5/2007 | Moretz | F16H 61/0276 137/625.11 |
| 2012/0192832 | A1 | 8/2012 | Hayashi | |
| 2018/0292016 | A1 * | 10/2018 | Ledvora | F16K 5/0471 |
| 2018/0335153 | A1 * | 11/2018 | Ozeki | F16K 5/0485 |
| 2019/0242482 | A1 | 8/2019 | Saunders et al. | |
| 2020/0114725 | A1 * | 4/2020 | Kanzaki | F01P 7/165 |
| 2021/0131575 | A1 * | 5/2021 | Bunda | F16K 5/0471 |
| 2021/0354138 | A1 * | 11/2021 | Grochowski | F16K 11/085 |
| 2022/0316607 | A1 * | 10/2022 | Surve | F16K 27/065 |
| 2022/0316608 | A1 * | 10/2022 | Tiemeyer | F16K 11/0856 |
| 2023/0332697 | A1 * | 10/2023 | Hu | F16K 11/0856 |

FOREIGN PATENT DOCUMENTS

| | | |
|---|---|---|
| CN | 108488436 A | 9/2018 |
| CN | 110410534 A | 11/2019 |
| DE | 102019107190 A1 | 9/2020 |
| EP | 4051936 A1 | 9/2022 |
| JP | 2017150630 A | 8/2017 |
| KR | 20170033527 A | 3/2017 |
| WO | 2020259398 A1 | 12/2020 |
| WO | 2021087106 A1 | 5/2021 |

OTHER PUBLICATIONS

First Office Action dated Feb. 2, 2024 received in corresponding patent family application No. JP2023-558920. English translation attached.

Written Decision dated Dec. 17, 2024 received in corresponding patent family application No. KR 10-2023-7023462. English translation attached.

International Search Report dated Aug. 26, 2021 in International Application No. PCT/CN2021/076473. English translation attached.

* cited by examiner (a) First operation mode: at 0°

(b) Second operation mode: rotating by 90°

(c) Third operation mode: rotating by 180°

(d) Fourth operation mode: rotating by 270°

INTEGRATED MULTI-WAY SOLENOID VALVE AND VEHICLE THERMAL MANAGEMENT SYSTEM

CROSS-REFERENCE TO RELATED APPLICATION

This application is a continuation of International Application No. PCT/CN2021/076473 filed on Feb. 10, 2021, the entire disclosure of which is incorporated herein by reference.

FIELD

The present disclosure relates to valve technologies, and more particularly, to an integrated multi-way valve and a vehicle thermal management system.

BACKGROUND

A valve is an essential element for automatic control of a fluid. In various fluid management systems, particularly in a thermal management system of a vehicle such as an electric vehicle, the valve is required to achieve the control of the fluid.

In an existing vehicle thermal management system, in accordance with a principle diagram of the whole vehicle thermal management, it is necessary for various operation conditions to be achieved by the valve. A conventional valve includes a two-way valve, a three-way valve, a four-way valve, etc. Due to use of numerous valves, the thermal management system has a plurality of interfaces, complex pipelines, great occupied space, and large weight, which is not conducive to vehicle weight reduction and space utilization. Especially for a pure electric vehicle, as operation conditions of design requirements for the whole vehicle thermal management system increases in order to improve battery life, valve problems have become increasingly prominent. Therefore, an integrated multi-way valve, capable of saving cost and arrangement space, and light-weighting, is urgently needed to be developed.

SUMMARY

In view of the above problems, the present disclosure is proposed to provide an integrated multi-way valve and a vehicle thermal management system, which can overcome the above problems or at least partially solve the above problems.

According to some embodiments of the present disclosure, an integrated multi-way valve with light weight is provided to greatly save arrangement space and cost and improve distribution aesthetics of pipelines.

According to some embodiments of the present disclosure, it is possible to simplify manipulation of the integrated multi-way valve while saving arrangement space by means of a specific arrangement of channel interfaces on a mounting panel of a flat plate shape and a specific arrangement of communication grooves on a valve cartridge.

According to some embodiments of the present disclosure, it is also possible to further enhance light-weighting of an integrated multi-way valve.

According to one embodiment of the present disclosure, there is provided an integrated multi-way valve. The integrated multi-way valve includes a mounting panel, a valve seat of a cylindrical shape, a valve cartridge of a cylindrical shape, and a driving assembly in transmission connection with the valve cartridge. N channel interfaces are defined on the mounting panel and arranged in a first predetermined pattern, where N is an integer greater than or equal to 5. The valve seat is fixedly connected to the mounting panel, and N openings are defined on the valve seat and in communication with N channel interfaces correspondingly. The valve cartridge is disposed in the valve seat in a close engagement manner with the valve seat. A plurality of communication grooves is defined on a circumferential surface of the valve cartridge and arranged in a second predetermined pattern. The driving assembly is configured to drive the valve cartridge to rotate by a predetermined angle to bring at least one target communication groove of the plurality of communication grooves into communication with a plurality of target openings of the N openings respectively, to allow for communication between the channel interfaces corresponding to the plurality of target openings. Each of the at least one target communication groove is in communication with at least two of the plurality of target openings.

In some embodiments of the present disclosure, a rotary shaft is provided for the valve cartridge and located on a central axis of the valve cartridge. The driving assembly includes a motor, and a transmission mechanism connected to an output shaft of the motor and the rotary shaft. The transmission mechanism is configured to transmit power output from the output shaft of the motor to the rotary shaft to drive the valve cartridge to rotate.

In some embodiments of the present disclosure, the transmission mechanism includes a first bevel gear connected to the output shaft of the motor, a second bevel gear engaged with the first bevel gear, a third gear coaxially arranged with the second bevel gear and driven by the second bevel gear to rotate together with the second bevel gear, and a fourth gear engaged with the third gear and connected to the rotary shaft.

In some embodiments of the present disclosure, the mounting panel is of a flat plate shape. N channels are defined on a side of the mounting panel facing towards the valve seat. Each of the N channels extends to a corresponding one of the N openings from a corresponding one of the N channel interfaces to communicate the corresponding channel interface with the corresponding opening.

In some embodiments of the present disclosure, N is equal to 9.

In some embodiments of the present disclosure, the predetermined angle is equal to 90°.

In some embodiments of the present disclosure, nine channel interfaces are arranged in three rows. Four of the nine channel interfaces are arranged on an upper row of the three rows, four of the nine channel interfaces are arranged on a lower row of the three rows, and one of the nine channel interfaces is arranged on a middle row of the three rows. The plurality of communication grooves defined on the circumferential surface of the valve cartridge is arranged in two rows including an upper row and a lower row or arranged in three rows. The plurality of communication grooves includes a first communication groove configured to communicate the four channel interfaces on the upper row with the one channel interface on the middle row, a second communication groove configured to communicate the four channel interfaces on the lower row with the one channel interface on the middle row, and a third communication groove configured to communicate the four channel interfaces on the upper row with the four channel interfaces on the lower row.

In some embodiments of the present disclosure, the first communication groove is L-shaped or linear shaped. The second communication groove is L-shaped or linear shaped. The third communication groove is L-shaped or linear shaped.

In some embodiments of the present disclosure, the valve cartridge includes a sleeve located at a center of the valve cartridge and configured for an insertion of the rotary shaft, a first anti-shrinking slot of an annular shape, a body located at a periphery of the first anti-shrinking slot, and a reinforcing rib disposed in the first anti-shrinking slot to connect the sleeve and the body. The first anti-shrinking slot is defined around the sleeve and penetrates the valve cartridge in an axial direction of the valve cartridge. The plurality of communication grooves is defined on a circumferential surface of the body.

In some embodiments of the present disclosure, a second anti-shrinking slot is defined on the valve cartridge, and extends from an end face of the valve cartridge in an axial direction of the valve cartridge. The second anti-shrinking slot is located on a part of the valve cartridge where no communication groove is defined.

In some embodiments of the present disclosure, the second anti-shrinking slot has a trapezoidal axial cross-section.

In some embodiments of the present disclosure, at least one end face of the valve cartridge has a sector dividing line to divide the at least one end face into a plurality of sectors, each of the plurality of sectors corresponding to an operation mode of the integrated multi-way valve. A mode identifier is disposed on the at least of end surface.

In some embodiments of the present disclosure, the valve cartridge is integrally formed by injection molding.

In some embodiments of the present disclosure, the mounting panel and the valve seat are integrally formed by injection molding.

According to one embodiment of the present disclosure, there is provided a vehicle thermal management system including the integrated multi-way valve according to any one of the above embodiments.

In the integrated multi-way valve according to the embodiments of the present disclosure, several passageways can be achieved through using a combination of one valve cartridge and one valve seat, instead of through a plurality of valves. Hence, the integrated multi-way valve according to the embodiments of the present disclosure has high integration and compact arrangement, thereby saving the arrangement space of the valve. Furthermore, since all the channel interfaces, i.e., ports connected to inlet pipelines and outlet pipelines, are integrally arranged on one mounting panel, positions of the interfaces are integrated, which can further reduce a volume of the integrated multi-way valve and significantly improve an arrangement space and distribution aesthetics of the pipelines connected to the interfaces. In comparison with use of a plurality of separate valves, the integrated multi-way valve of the present disclosure has low cost and light weight, and is particularly suitable for the vehicle thermal management system to satisfy the requirements for operation conditions of the whole vehicle thermal management.

Furthermore, one three-way valve and two four-way valves in the vehicle thermal management system can be replaced with the integrated multi-way valve according to the embodiments of the present disclosure to realize nine passageways. In this way, cost of the whole vehicle can be lowered by at least about 200 yuan, and weight of the whole vehicle can be reduced by at least about 500 g.

Further, in the present disclosure, the mounting panel is of the flat plate shape, the channel interfaces are arranged on the mounting panel in regular three rows, and the communication grooves are arranged on the valve cartridge in two or three rows correspondingly. Therefore, the arrangement space can be saved, and manipulation of the integrated multi-way valve can be simplified, which allows for communication between the corresponding channel interfaces via the communication grooves. Thus, it is possible to satisfy different requirements for the operation conditions.

Further, by providing the anti-shrinking slots on the valve cartridge, it is possible to reduce a surficial shrinkage mark on the surface of the valve cartridge. Furthermore, the weight of the integrated multi-way valve can be further reduced, which can enhance the light-weighting.

The above description is merely an overview of the technical solutions of the present disclosure. To facilitate a clear understanding of technical approaches of the present disclosure, the technical solutions can be performed in accordance with the contents of the specification. Meanwhile, to clarify and explain the above and other objects, features, and advantages of the present disclosure, specific implementations of the present disclosure will be described below.

The above and other objects, advantages, and features of the present disclosure will become more apparent to those skilled in the art from the following detailed description of specific embodiments of the present disclosure made with reference to the accompanying drawings.

BRIEF DESCRIPTION OF THE DRAWINGS

Some specific embodiments of the present disclosure will be described below in detail with reference to the accompanying drawings in an exemplary rather than restrictive manner. In the accompanying drawings, same or similar elements or parts are denoted by same reference numerals. It should be understood by those skilled in the art that these accompanying drawings are not necessarily drawn to scale. In the accompanying drawings.

DETAILED DESCRIPTION

Exemplary embodiments of the present disclosure will be described in detail below with reference to the accompanying drawings. Although the exemplary embodiments of the present disclosure are illustrated in the accompanying drawings, it should be understood that the present disclosure may be embodied in various forms and should not be construed as being limited to the embodiments set forth herein. Instead, these embodiments are provided for a thorough understanding of the present disclosure and can fully convey the scope of the disclosure to those skilled in the art.

In order to solve, or at least partially solve the above problems, embodiments of the present disclosure provide an integrated multi-way valve.

Figure 1:
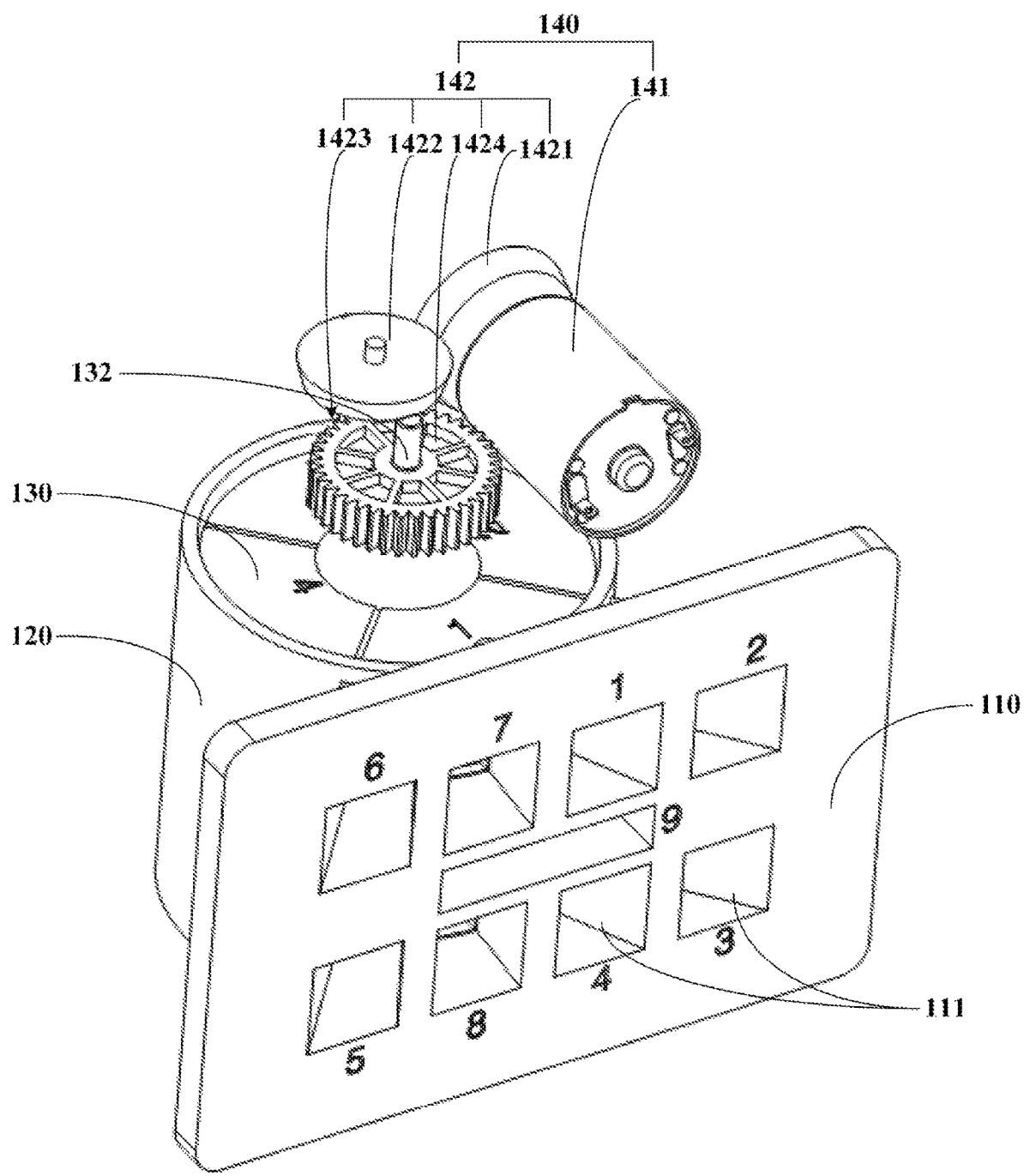
FIG. 1 is a schematic view of an overall structure of an integrated multi-way valve according to an embodiment of the present disclosure.
Figure 4:
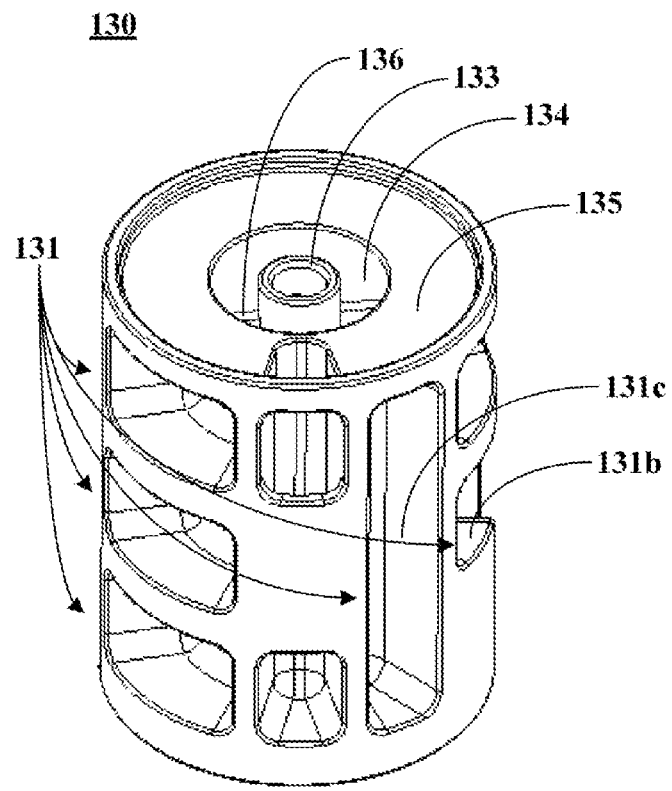
FIG. 4 is a schematic view of a structure of a valve cartridge of an integrated multi-way valve according to an embodiment of the present disclosure.
Figure 5:
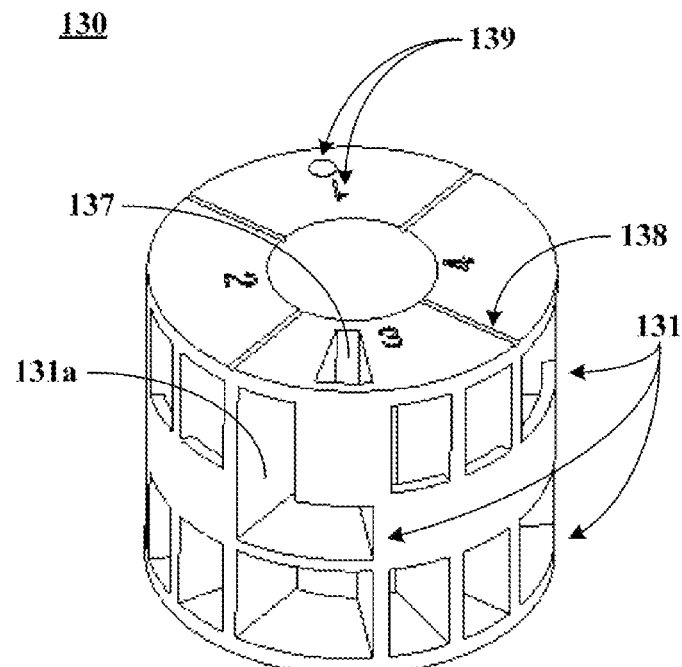
FIG. 5 is another schematic view of a structure of a valve cartridge of an integrated multi-way valve according to an embodiment of the present disclosure.
Figure 6:
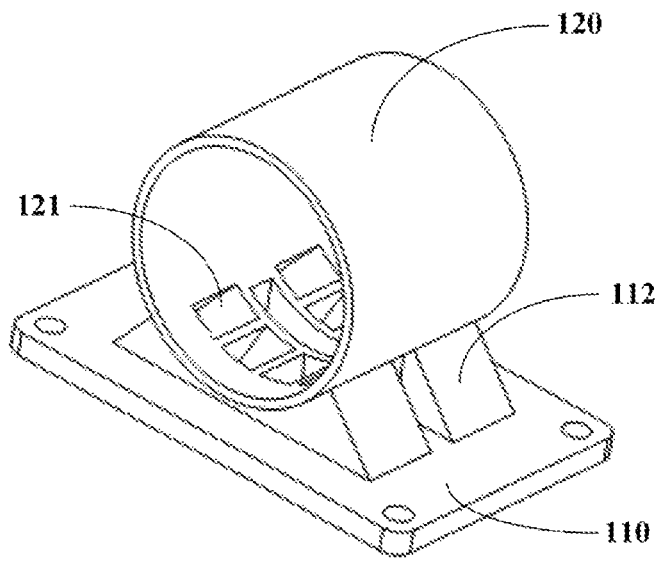
FIG. 6 is a schematic view of an assembly of a valve seat and a mounting panel of an integrated multi-way valve according to an embodiment of the present disclosure.

FIG. 1 is a schematic view of an overall structure of an integrated multi-way valve 100 according to an embodiment of the present disclosure. With reference to FIG. 1, the integrated multi-way valve 100 may generally include a mounting panel 110, a valve seat 120 of a cylindrical shape, a valve cartridge 130 of a cylindrical shape, and a driving assembly 140. N channel interfaces 111 are defined on the mounting panel 110 and arranged in a first predetermined pattern, where N is an integer greater than or equal to 5. Each of the N channel interfaces 111 is configured to be connected to a pipeline external to the multi-way valve 100. The valve seat 120 is fixedly connected to the mounting panel 110. N openings 121 are defined on the valve seat 120, i.e., on a circumferential surface of the valve seat 120. The N openings 121 are in communication with N channel interfaces 111 correspondingly. The valve cartridge 130 is disposed in the valve seat 120 in a close engagement manner with the valve seat 120. A plurality of communication grooves 131 is defined on a circumferential surface of the valve cartridge 130 and arranged in a second predetermined pattern. The second predetermined pattern is associated with the first predetermined pattern. The second predetermined pattern may be adjusted based on the first predetermined pattern in a practical application. The driving assembly 140 is in transmission connection with the valve cartridge 130. The driving assembly 140 is configured to drive the valve cartridge 130 to rotate by a predetermined angle to bring at least one target communication groove of the plurality of communication grooves 131 into communication with a plurality of target openings of the N openings 121, to allow for communication between the channel interfaces 111 corresponding to the plurality of the target opening. Each of the at least one target communication groove may be in communication with at least two of the plurality of target openings to allow for communication between at least two channel interfaces 111 corresponding to at least two of the plurality of target openings that are in communication with the at least one target communication groove, which in turn allows for fluid circulation between pipelines connected to the at least two channel interfaces 111. It should be noted that, in order to clearly show the overall structure of the integrated multi-way valve 100, the openings 121 on the valve seat 120 and the communication grooves 131 on the valve cartridge 130 are not illustrated in FIG. 1. An example of the openings 121 is illustrated in FIG. 6, and an example of the communication grooves 131 is illustrated in FIG. 4 and FIG. 5. In addition, in the accompanying drawings of the present disclosure, reference numbers 1 to 9 labeled next to the channel interfaces 111 are merely used to represent different channel interfaces 111, and the present disclosure is not limited thereto.

In the integrated multi-way valve according to the embodiments of the present disclosure, several passageways can be achieved only through using a combination of one valve cartridge and one valve seat, instead of through a plurality of valves. Hence, the integrated multi-way valve according to the embodiments of the present disclosure has high integration and compact arrangement, thereby saving an arrangement space of the valve. Furthermore, since all the channel interfaces, i.e., ports connected to inlet pipelines and outlet pipelines, are integrally arranged on one mounting panel, positions of the interfaces are integrated, which can further reduce a volume of the integrated multi-way valve and significantly improve an arrangement space and distribution aesthetics of the pipelines connected to the interfaces. In comparison with use of a plurality of separate valves, the integrated multi-way valve of the present disclosure has low cost and light weight, and is particularly suitable for a vehicle thermal management system to satisfy the requirements for operation conditions of a whole vehicle thermal management.

In an embodiment, with continued reference to FIG. 1, a rotary shaft 132 is provided for the valve cartridge 130 and located on a central axis of the valve cartridge 130. The driving assembly 140 includes a motor 141 and a transmission mechanism 142. The transmission mechanism 142 is connected to an output shaft of the motor 141 and the rotary shaft 132, and is configured to transmit power output from the output shaft of the motor 141 to the rotary shaft 132 to drive the valve cartridge 130 to rotate.

Further, the transmission mechanism 142 may include a first bevel gear 1421 connected to the output shaft of the motor 141, a second bevel gear 1422 engaged with the first bevel gear 1421, a third gear 1423 coaxially arranged with the second bevel gear 1422 and driven by the second bevel gear 1422 to rotate together with the second bevel gear 1422, and a fourth gear 1424 engaged with the third gear 1423 and connected to the rotary shaft 132. In some embodiments, the fourth gear 1424 is sleeved over the rotary shaft 132. The power output from the output shaft of the motor 141 is transmitted to the rotary shaft 132 via the first bevel gear 1421, the second bevel gear 1422, the third gear 1423, and the fourth gear 1424. The third gear 1423 may be a pinion relative to the fourth gear 1424 in practical application. With this arrangement, it is possible to realize smooth transmission of the power to ensure smoothness of rotation of the valve cartridge 130.

In some embodiments, the mounting panel 110 may be designed into a flat plate shape. The flat plate-shaped design can make the arrangement of the channel interfaces 111 more uniform and aesthetic, and easy to be observed. Correspondingly, the arrangement of the inlet pipelines and outlet pipelines that are connected to the channel interfaces 111 is more compact and more aesthetic.

Referring to FIG. 6, for the mounting panel 110 of the flat plate shape, in order to bring the channel interfaces 111 arranged on the mounting panel 110 into communication with openings 121 on the valve seat 120, N channels may be defined on a side of the mounting panel facing towards the valve seat. Each of the N channels 112 extends to a corresponding one of the N opening 121 from a corresponding one of the N channel interface 111 to communicate the corresponding channel interface 111 with the corresponding opening 121. In some embodiments of the present disclosure, each of the N channels 112 extends in a straight line to reduce circulation resistance. Further, each of the N channels 112 may be tapered from one end thereof connected to one of the N channel interfaces 111 to the other end thereof connected to one of the N openings 121. With this design, it is possible to allow the opening 121 to be more densely arranged on the valve seat 120, thereby facilitating the design and processing of the communication grooves 131 on the valve cartridge 130.

Figure 3:
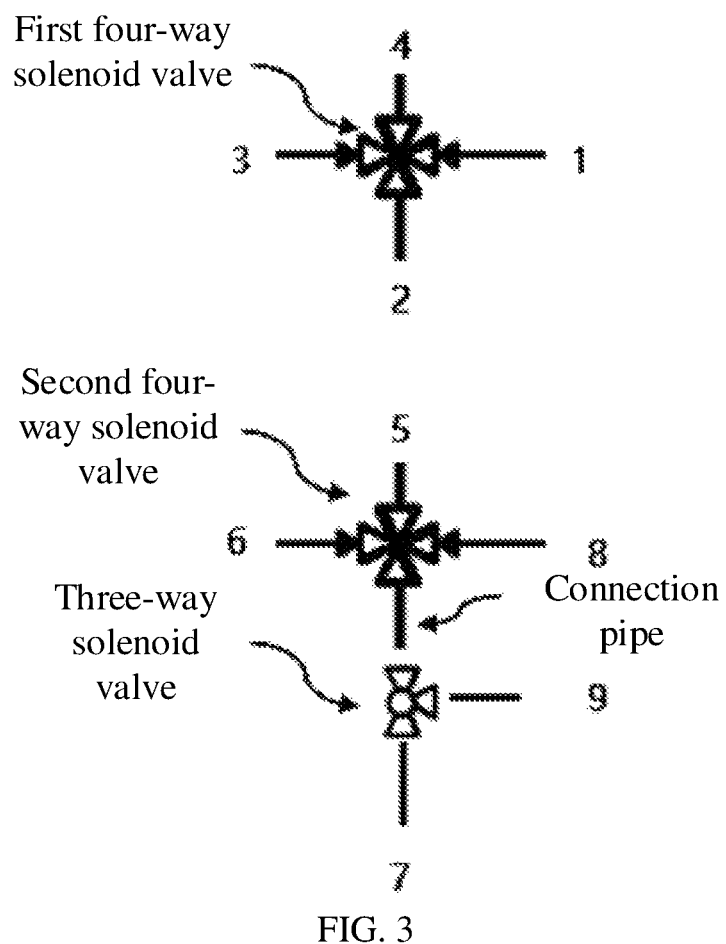
FIG. 3 is a schematic view of a principle of a plurality of valves equivalent to an integrated multi-way valve according to an embodiment of the present disclosure.

Since the integrated multi-way valve 100 has several passageways that may be realized by the plurality of valves, the integrated multi-way valve 100 may be equivalent to the plurality of valves. In some embodiments of the present disclosure, N may be equal to 9. That is, nine channel interfaces 111 are defined on the mounting panel 110. In this case, the integrated multi-way valve 100 may have nine passageways, which is equivalent to achieving functions provided by a three-way solenoid valve and two four-way valves in the related art. FIG. 3 illustrates a schematic view of a plurality of valves (for example, one three-way valve and two four-way valves) equivalent to the integrated multi-way valve according to the embodiments of the present disclosure. As illustrated in FIG. 3, a channel interface 1 to a channel interface 4 of the integrated multi-way valve 100 are equivalent to four ports of a first four-way valve, a channel interface 5, a channel interface 6, and a channel interface 8 are equivalent to three ports of a second four-way valve, and a channel interface 7 and a channel interface 9 are equivalent to two ports of the three-way solenoid valve connected to the second four-way valve by connection pipes. In this way, one three-way valve and two four-way valves in the vehicle thermal management system can be replaced with the integrated multi-way valve according to the embodiments of the present disclosure to realize nine passageways. In this way, cost of the whole vehicle can be lowered by at least about 200 yuan, and weight of the whole vehicle can be reduced by at least about 500 g.

Figure 2:
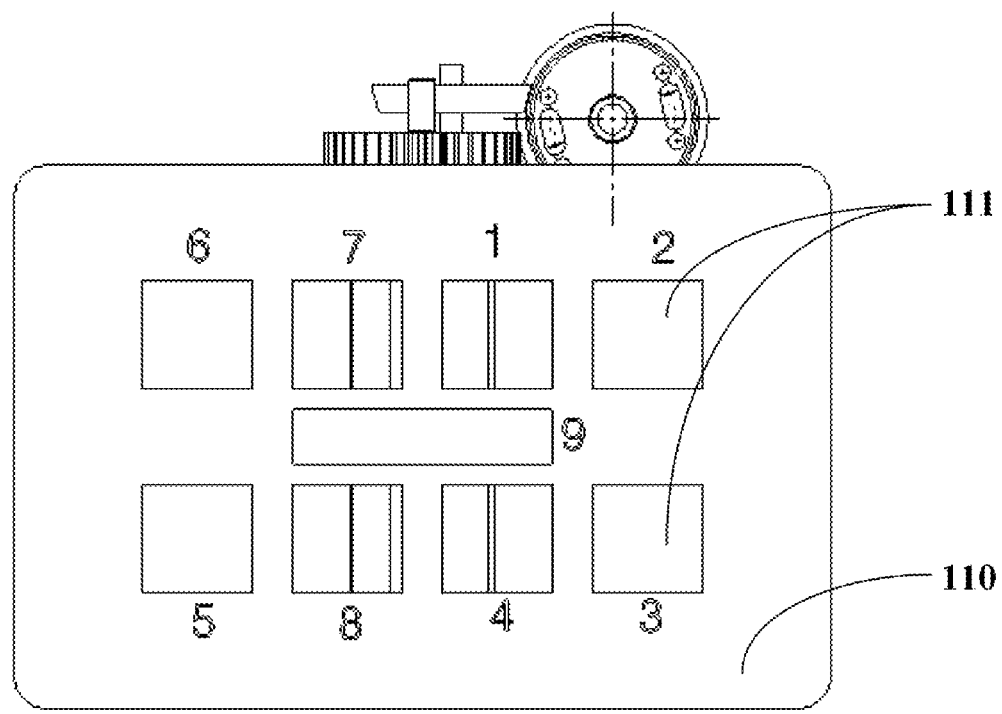
FIG. 2 is a schematic view of an arrangement of channel interfaces on a mounting panel of an integrated multi-way valve according to an embodiment of the present disclosure.

In the practical application, the first predetermined pattern in which the channel interfaces 111 are arranged on the mounting panel 110 may be reasonably designed based on actual application requirements and the number of the channel interfaces 111. In some embodiments, referring to FIG. 2, the nine channel interfaces 111 may be arranged in three rows. In this arrangement, four of the nine channel interfaces 111 are arranged on an upper row of the three rows, four of the nine channel interfaces 111 are arranged on a lower row of the three rows, and one of the channel interfaces 111 is arranged on a middle row of the three rows. Correspondingly, an arrangement pattern of the openings 121 on the valve seat 120 is same to the arrangement pattern of the nine channel interfaces 111. In order to bring the desired channel interfaces 111 into communication with each other via the communication grooves 131, the second predetermined pattern in which the communication grooves 131 are arranged on the circumferential surface of the valve cartridge 130 may be designed differently. FIG. 4 and FIG. 5 illustrate two different structures of the valve cartridge 130, respectively, in which different arrangement patterns of the communication grooves 131 on the circumferential surface of the valve cartridge 130 are also illustrated.

In an implementation of the present disclosure, as illustrated in FIG. 4, the plurality of communication grooves 131 is arranged in three rows including an upper row, a middle row, and a lower row. Each of the three rows of the plurality of the communication grooves corresponds to each of the three rows of the openings 121. In addition to the communication grooves extending in a circumferential direction of the valve cartridge 130 to communicate the channel interfaces 111 on the same row with each other, the communication grooves 131 may also include a first communication groove 131*a* configured to communicate the channel interfaces 111 on the upper rows with the channel interfaces 111 on the middle row, a second communication groove 131*b* configured to communicate the channel interfaces 111 on the lower row with the channel interfaces 111 on the middle row, and a third communication groove 131*c* configured to communicate the channel interfaces 111 on the upper row with the channel interfaces 111 on the lower row. It can be understood that the first communication groove 131*a* extends substantially in an axial direction of the valve cartridge 130 across the upper and middle rows where the communication grooves 131 are arranged, and may be L-shaped or linear shaped. Similarly, the second communication groove 131*b* extends substantially in the axial direction of the valve cartridge 130 across the lower and middle rows where the communication grooves 131 are arranged, and may be L-shaped or linear shaped. The third communication groove 131*c* extends substantially in the axial direction of the valve cartridge 130 across the upper and lower rows (which may perpetrate the middle row) where the communication grooves 131 are arranged, and may be L-shaped or linear shaped.

In another implementation of the present disclosure, as illustrated in FIG. 5, the plurality of communication grooves 131 is arranged in two rows including an upper row and a lower row. The communication grooves 131 on the upper row correspond to the openings 121 on the upper row, and the communication grooves 131 on the lower row correspond to the openings 121 on the lower row. A part between communication grooves 131 on the upper row and communication grooves 131 on the lower row may serve as a blocking row corresponding to the openings 121 in the middle layer. Likewise, in addition to the communication grooves extending in the circumferential direction of the valve cartridge 130 to communicate the channel interfaces 111 on the same row with each other, the communication grooves 131 may also include a first communication groove 131*a* configured to communicate the channel interfaces 111 on the upper row and the channel interfaces 111 on the middle row, a second communication groove 131*b* configured to communicate the channel interfaces 111 on the lower row with the channel interfaces 111 on the middle row, and a third communication groove 131*c* configured to communicate the channel interfaces 111 on the upper row with the channel interfaces 111 on the lower row. In this implementation, the first communication groove 131*a* extends substantially in the axial direction of the valve cartridge 130 across the upper and middle blocking rows where the communication grooves 131 are arranged, and may be L-shaped or linear shaped. Similarly, the second communication groove 131*b* extends substantially in the axial direction of the valve cartridge 130 across the lower and middle blocking rows where the communication grooves 131 are arranged, and may be L-shaped or linear shaped. The third communication groove 131*c* extends substantially in the axial direction of the valve cartridge 130 across the upper and lower rows (which may perpetrate the middle blocking row) where the communication grooves 131 are arranged, and may be L-shaped or linear shaped.

It should be noted that, due to limitation of a view angle, the first communication groove 131*a* is not illustrated in FIG. 4, and neither the second communication groove 131*b* nor the third communication groove 131*c* is illustrated in FIG. 5. However, it should be appreciated by those skilled in the art that the first communication groove 131*a*, the second communication groove 13*b*, and the third communication groove 131*c* as described above may be included in each of the implementations according to the present disclosure.

The channel interfaces 111 are arranged on the mounting panel 110 in regular three rows, and the communication grooves 131 are arranged on the valve cartridge 130 in two or three rows correspondingly. Therefore, the arrangement space can be saved, and manipulation of the integrated multi-way valve can be simplified, which allows for communication between the corresponding channel interfaces 111 via the communication grooves 131. Thus, it is possible to satisfy different requirements for the operation conditions.

In some embodiments, the valve cartridge 130 may be integrally formed by injection molding, thereby simplifying a manufacturing process of the integrated multi-way valve 100 and improving manufacturing efficiency.

In some embodiments, the mounting panel 110 and the valve seat 120 may be integrally formed by injection molding, thereby simplifying the manufacturing process of the integrated multi-way valve 100 and improving the manufacturing efficiency. In addition, when the integrated multi-way valve 100 is applied to the vehicle thermal management system, the mounting panel 110 and the valve seat 120 may also be integrated with other thermal management elements such as an integrated pipe or a kettle in the vehicle thermal management system, and integrally formed with the thermal management elements by injection-molded.

When the integrated multi-way valve 100 is applied to an application for controlling fluid circulation such as the vehicle thermal management, different fluid passageways are required in different operation conditions. In this case, communication between different channel interfaces 111 needs to be controlled. Through the specific arrangement designs of the channel interfaces 111 and communication grooves 131, communication between different channel interfaces 111 corresponding to different operation conditions can be realized by driving the valve cartridge 130 to rotate by a predetermined angle. The predetermined angle may be set as desired, which is not limited in the present disclosure. For example, when there are m (m is a positive integer) desired operation conditions, the predetermined angle may be equal to a quotient Q obtained by dividing an angle of 360° by M. In this case, the communication grooves 131 on the valve cartridge 130 may be divided into m groups that are uniformly distributed on the circumferential surface of the valve cartridge 130, and each group of the communication grooves 131 is designed based on the requirements for the communication between different channel interfaces 111 under the corresponding operation conditions. Therefore, after the valve cartridge 130 is driven to rotate by taking Q degree(s) as a unit, the fluid passageways under the corresponding operation conditions can be realized via the corresponding one of m groups of the communication grooves 131.

In an embodiment of the present disclosure, as illustrated in FIG. 5, in order to more intuitively observe states of the valve cartridge 130 under several operation conditions, at least one end surface of the valve cartridge 130 may have a sector dividing line 138 to divide the at least end face into a plurality of sectors. Each of the plurality of sectors corresponds to one operation mode of the integrated multi-way valve 100. Each operation mode of the integrated multi-way valve 100 corresponds to one system operation condition. Further, a mode identifier 139 may also be disposed on the at least one end surface. The mode identifier 139 may be a text, a graphic, a number, etc., which is not limited in the present disclosure. For example, as illustrated in FIG. 5, number 1, number 2, number 3, and number 4 may be used to represent four different operation modes, respectively. In this case, a circle is identified next to the number 1, which represents that the operation mode 1 is an initial operation mode. That is, before the integrated multi-way valve 100 leave factory, the valve cartridge 130 should be in an initial state where the sector 1 is aligned with a distribution position of the openings 121 of the valve seat 120.

Description on how to realize different passageways by the integrated multi-way valve 100 under different operation conditions will be provided below taking the vehicle thermal management system as an example.

In this example, based on the requirements for the whole vehicle, the vehicle thermal management system needs nine inlet and outlet pipelines, and the integrated multi-way valve 100 has nine channel interfaces 1 to 9 correspondingly. Assuming four operation conditions including a first operation condition, a second operation condition, a third operation condition, and a fourth operation condition are required for the whole vehicle thermal management of the vehicle thermal management system.

In the first operation condition, the channel interface 2 is in communication with the channel interface 1, the channel interface 4 is in communication with channel interface 3, the channel interface 8 is in communication with the channel interface 7, the channel interface 6 is in communication with the channel interface 5, and the channel interface 9 is blocked.

In the second operation condition, the channel interface 2 is in communication with the channel interface 3, the channel interface 4 is in communication with the channel interface 1, the channel interface 8 is in communication with the channel interface 9, the channel interface 6 is in communication with the channel interface 5, and the channel interface 7 is blocked.

In the third operation condition, the channel interface 2 is in communication with channel interface 3, the channel interface 4 is in communication with the channel interface 1, the channel interface 8 is in communication with the channel interface 5, the channel interface 6 is in communication with channel interface 9, and the channel interface 7 is blocked.

In the fourth operation condition, the channel interface 2 is in communication with the channel interface 3, the channel interface 4 is in communication with the channel interface 1, the channel interface 8 is in communication with the channel interface 5, the channel interface 6 is in communication with the channel interface 7, and the channel interface 9 is blocked.

Figure 7:
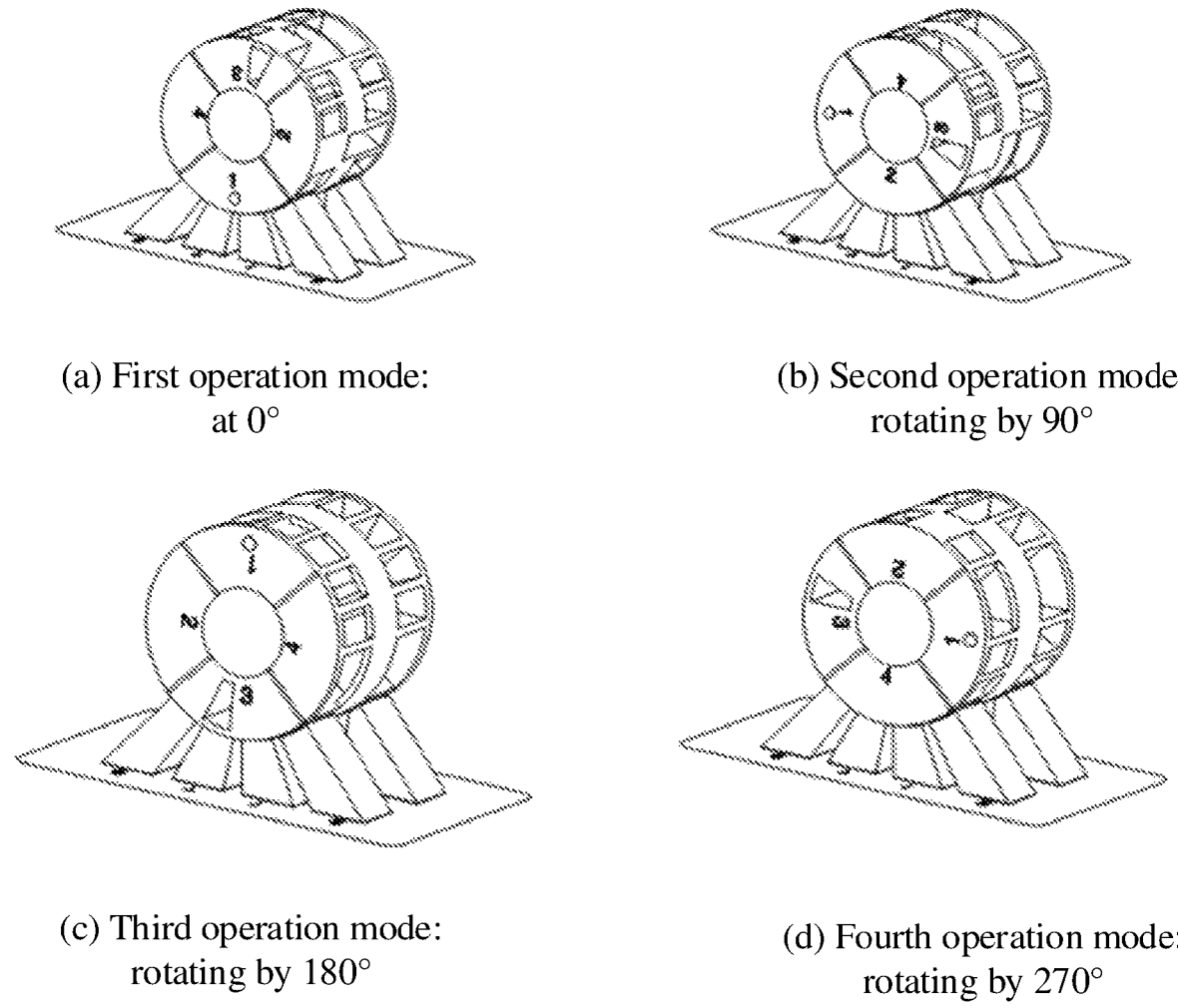
FIG. 7 is a schematic view of a state of a valve cartridge of an integrated multi-way valve in each operation mode according to an embodiment of the present disclosure.

The predetermined angle 90° by which the valve cartridge 130 rotates is obtained by dividing the angle of 360° by 4. Each time the valve cartridge 130 rotates by 90°, communication between different channel interfaces can be realized under one operation condition, thereby achieving different passageways. FIGS. 7, (a), (b), (c), and (d) illustrate a state of the valve cartridge 130 of the integrated multi-way valve 100 in each operation mode. Referring to FIG. 7, when the valve cartridge 130 rotates by an angle of 0° relative to the initial state, the integrated multi-way valve 100 is in a first operation mode, i.e., the initial operation mode, which can achieve the passageway requirement for the vehicle thermal management system in the first operation condition. When the valve cartridge 130 rotates clockwise by an angle of 90°, the integrated multi-way valve 100 is brought into a second operation mode, which can achieve the passageway requirements for the vehicle thermal management system in the second operation condition. When the valve cartridge 130 rotates clockwise by an angle of 180°, the integrated multi-way valve 100 is brought into a third operation mode, which can achieve the passageway requirements for the vehicle thermal management system in the third operation condition. When the valve cartridge 130 rotates clockwise by an angle of 270°, the integrated multi-way valve 100 is brought into a fourth operation mode, which can achieve the passageway requirements for the vehicle thermal management system in the fourth operation condition. Thereafter, the valve cartridge 130 rotates clockwise by an angle of 90°, and returns back to the first operation mode.

Figure 8:
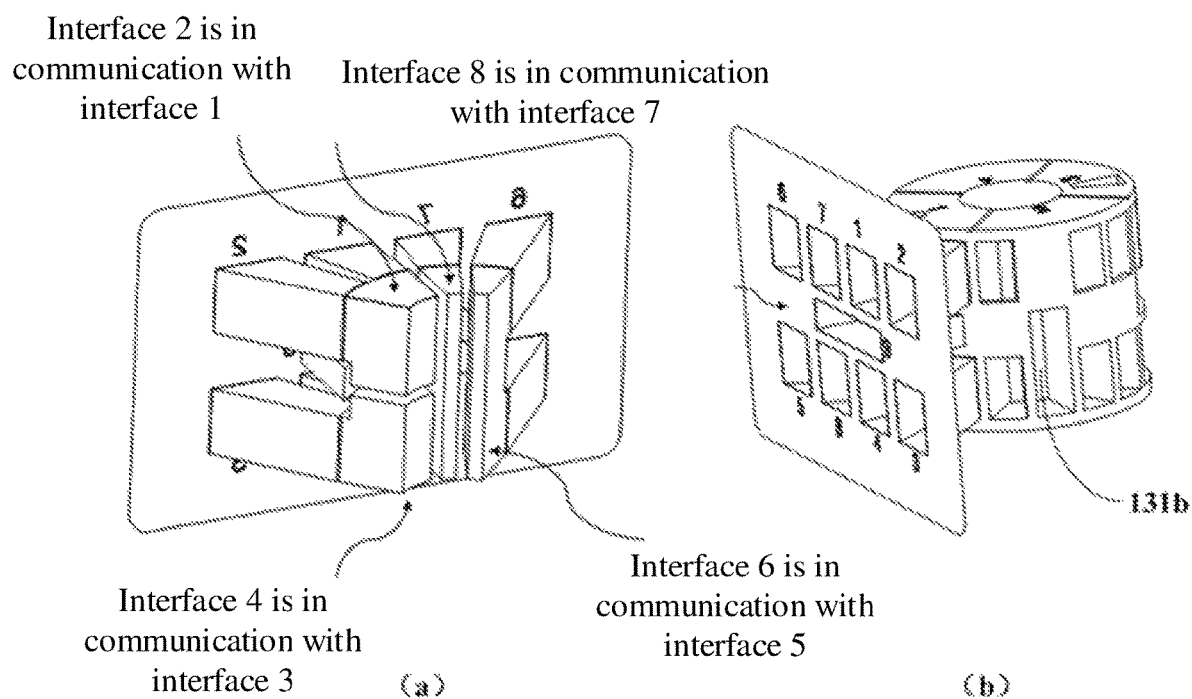
FIG. 8 is a schematic view of a state of communication between communication grooves of the valve cartridge and channel interfaces in a first operation mode illustrated in FIG. 7.

In each operation mode, communication between the target channel interfaces can be realized via a corresponding one of the m groups of communication grooves 131 (i.e., the target communication grooves) in the operation mode. Description will be provided below taking the first operation mode as an example. Referring to FIGS. 8(*a*) and (*b*), in this operation mode, the communication between the channel interface 2 and the channel interface 1, the communication between the channel interface 4 and the channel interface 3, the communication between the channel interface 8 and the channel interface 7, and the communication between the channel interface 6 and the channel interface 5 are realized via the corresponding communication grooves 131, respectively, and the channel interface 9 is blocked by the middle blocking row of the valve cartridge 130 to block the channel interface 9.

An operation principle of the integrated multi-way valve 100 according to the embodiments of the present disclosure has been described above. In the practical application, especially in the whole vehicle application, the light-weighting of the solenoid valve is also a significant factor that should be considered. In order to further reduce the weight of the integrated multi-way valve 100, in some embodiments, the structure of the valve cartridge 130 may be further modified.

In one embodiment, referring to FIG. 4, the valve cartridge 130 may include a sleeve 133 located at a center of the valve cartridge 130, a first anti-shrinking slot 134 of a circular shape, a body 135 located at a periphery of the first anti-shrinking slot 134, and a reinforcing rib 136 disposed in the first anti-shrinking slot 134 to connect the sleeve 133 and the body 135. The sleeve 133 is configured for an insertion of the rotary shaft 132. The first anti-shrinking slot 134 is defined around the sleeve 133 and penetrates the valve cartridge 130 in an axial direction of the valve cartridge 130. The plurality of communication grooves 131 is disposed on a circumferential surface of the body 135. The reinforcing rib 136 may be of an elongated shape extending in the axial direction of the valve cartridge 130. A plurality of reinforcing ribs 136 may be provided. The plurality of reinforcing ribs 136 may be uniformly distributed in a circumferential direction of the sleeve 133, or may be symmetrically distributed relative to a central axis of the sleeve 133. In this embodiment, the valve cartridge 130 has a hollow structure due to the first anti-shrinking slot 134, thereby further reducing the weight of the integrated multi-way valve 100 and enhancing the light-weighting. Meanwhile, it is also possible for the first anti-shrinking slot 134 to reduce a surficial shrinkage mark of an injection molding member of the valve cartridge 130 due to uneven wall thicknesses during cooling, which can ensure a molding quality of the valve cartridge 130.

In another embodiment, referring to FIG. 5, a second anti-shrinking slot 137 may be defined on the valve cartridge 130, and extend from an end face of the valve cartridge 130 in an axial direction of the valve cartridge 130. The second anti-shrinking slot 137 is located on a part of the valve cartridge 130 where no communication groove 131 is defined. Further, the second anti-shrinking slot 137 has a trapezoidal axial cross-section. A shorter top side of the trapezoid faces towards the central axis of the valve cartridge 130, and a longer bottom side faces towards a circumference of the valve cartridge 130. Likewise, the weight of the integrated multi-way valve 100 can be further reduced by the second anti-shrinking slot 137. Further, it is also possible to reduce the surficial shrinkage mark of the injection molding member of the valve cartridge 130 due to the uneven wall thicknesses during the cooling, which can ensure the molding quality of the valve cartridge 130.

Based on the same technical concept, embodiments of the present disclosure further provide a vehicle thermal management system. The vehicle thermal management system includes the integrated multi-way valve 100 according to any of the above embodiments or combinations thereof. The vehicle thermal management system may further include pipelines connected to the channel interfaces of the integrated multi-way solenoid valve 100, and thermal management elements connected to each other by the pipelines, which should be well known for those skilled in the art, and detailed descriptions thereof will be omitted herein.

In the vehicle thermal management system according to the embodiments of the present disclosure, by means of the integrated multi-way valve 100, an arrangement space of the valve and the pipelines connected to the valve can be saved, and distribution aesthetics of the pipelines can be improved. Further, the weight of the whole vehicle can be reduced, and the cost can be lowered.

According to any one of the above embodiments or the combinations thereof, the embodiments of the present disclosure can achieve the following beneficial effects.

In the integrated multi-way valve according to the embodiments of the present disclosure, several passageways can be achieved through using a combination of one valve cartridge and one valve seat, instead of through a plurality of valves. Hence, the integrated multi-way valve according to the embodiments of the present disclosure has high integration and compact arrangement, thereby saving an arrangement space of the valve. Furthermore, since all the channel interfaces, i.e., ports connected to inlet pipelines and outlet pipelines, are integrally arranged on one mounting panel, positions of the interfaces are integrated, which can further reduce a volume of the integrated multi-way valve and significantly improve an arrangement space and distribution aesthetics of the pipelines connected to the interfaces. In comparison with use of a plurality of separate valves, the integrated multi-way valve of the present disclosure has low cost and light weight, and is particularly suitable for the vehicle thermal management system to satisfy the requirements for operation conditions of the whole vehicle thermal management.

Furthermore, one three-way valve and two four-way valves in the vehicle thermal management system can be replaced with the integrated multi-way valve according to the embodiments of the present disclosure to realize nine passageways. In this way, cost of the whole vehicle can be lowered by at least about 200 yuan, and weight of the whole vehicle can be reduced by at least about 500 g.

Further, in the present disclosure, the mounting panel is of the flat plate shape, the channel interfaces are arranged on the mounting panel in regular three rows, and the communication grooves are arranged on the valve cartridge in two or three rows correspondingly. Therefore, the arrangement space can be saved, and manipulation of the integrated multi-way valve can be simplified, which allows for communication between the corresponding channel interfaces via the communication grooves. Thus, it is possible to satisfy different requirements for the operation conditions.

Further, by providing the anti-shrinking slots on the valve cartridge, it is possible to reduce a surficial shrinkage mark on the surface of the valve cartridge. Furthermore, the weight of the integrated multi-way valve can be further reduced, which can enhance the light-weighting.

Those skilled in the art should appreciate that although the exemplary embodiments of the present disclosure have been illustrated and described in detail herein, many other variants or modifications consistent with the principle of the present disclosure may still be directly determined or derived based on the content of the present disclosure without departing from the spirit and scope of the present disclosure. Therefore, all these other variants or modifications shall fall within the scope of the present disclosure.

What is claimed is:

1. An integrated multi-way valve, comprising:
   a mounting panel, N channel interfaces being defined on the mounting panel and arranged in a first predetermined pattern, where N is an integer greater than or equal to 5;
   a valve seat of a cylindrical shape, the valve seat being fixedly connected to the mounting panel, and N openings being defined on the valve seat and in communication with the N channel interfaces correspondingly;
   a valve cartridge of a cylindrical shape, the valve cartridge being disposed in the valve seat in a close engagement manner with the valve seat, and a plurality of communication grooves being defined on a circumferential surface of the valve cartridge and arranged in a second predetermined pattern; and
   a driving assembly in transmission connection with the valve cartridge, the driving assembly being configured to drive the valve cartridge to rotate by a predetermined angle to bring at least one target communication groove of the plurality of communication grooves into communication with a plurality of target openings of the N openings respectively, to allow for communication between the channel interfaces corresponding to the plurality of the target openings,
   wherein each of the at least one target communication groove is in communication with at least two of the plurality of target openings,
   wherein N is equal to 9,
   wherein nine channel interfaces are arranged in three rows, four of the nine channel interfaces being arranged on an upper row of the three rows, four of the nine channel interfaces being arranged on a lower row of the three rows, and one of the nine channel interfaces being arranged on a middle row of the three rows; and
   wherein the plurality of communication grooves defined on the circumferential surface of the valve cartridge is arranged in two rows comprising an upper row and a lower row or arranged in three rows, the plurality of communication grooves comprising:
   a first communication groove configured to communicate the four channel interfaces on the upper row of the channel interfaces with the one channel interface on the middle row of the channel interfaces;
   a second communication groove configured to communicate the four channel interfaces on the lower row of the channel interfaces with the one channel interface on the middle row of the channel interfaces; and
   a third communication groove configured to communicate the four channel interfaces on the upper row of the channel interfaces with the four channel interfaces on the lower row of the channel interfaces.

2. The integrated multi-way valve according to claim 1, wherein:
   a rotary shaft is provided for the valve cartridge and located on a central axis of the valve cartridge; and
   the driving assembly comprises:
   a motor; and
   a transmission mechanism connected to an output shaft of the motor and the rotary shaft, the transmission mechanism being configured to transmit power output from the output shaft of the motor to the rotary shaft to drive the valve cartridge to rotate.

3. The integrated multi-way valve according to claim 2, wherein the transmission mechanism comprises:
   a first bevel gear connected to the output shaft of the motor;
   a second bevel gear engaged with the first bevel gear; and
   a fourth gear connected to the rotary shaft.

4. The integrated multi-way valve according to claim 2, wherein the valve cartridge comprises:
   a sleeve located at a center of the valve cartridge and configured for an insertion of the rotary shaft;
   a first anti-shrinking slot of an annular shape, the first anti-shrinking slot defined around the sleeve and penetrating the valve cartridge in an axial direction of the valve cartridge;
   a body located at a periphery of the first anti-shrinking slot, the plurality of communication grooves being defined on a circumferential surface of the body; and
   a reinforcing rib disposed in the first anti-shrinking slot to connect the sleeve and the body.

5. The integrated multi-way valve according to claim 1, wherein:
   the mounting panel is of a flat plate shape; and
   N channels are defined on a side of the mounting panel facing towards the valve seat, each of the N channels extending to a corresponding one of the N openings from a corresponding one of the N channel interfaces to communicate the corresponding channel interface with the corresponding opening.

6. The integrated multi-way valve according to claim 1, wherein the predetermined angle is equal to 90°.

7. The integrated multi-way valve according to claim 1, wherein:
   the first communication groove is L-shaped or linear shaped;
   the second communication groove is L-shaped or linear shaped; and
   the third communication groove is L-shaped or linear shaped.

8. The integrated multi-way valve according to claim 1, wherein a second anti-shrinking slot is defined on the valve cartridge, and extends from an end face of the valve cartridge in an axial direction of the valve cartridge, the second anti-shrinking slot being located on a part of the valve cartridge where no communication groove is defined.

9. The integrated multi-way valve according to claim 8, wherein the second anti-shrinking slot has a trapezoidal axial cross-section.

10. The integrated multi-way valve according to claim 1, wherein:
    at least one end face of the valve cartridge has a sector dividing line to divide the at least one end face into a plurality of sectors, each of the plurality of sectors corresponding to an operation mode of the integrated multi-way valve; and
    a mode identifier is disposed on the at least one end face.

11. The integrated multi-way valve according to claim 1, wherein the valve cartridge is integrally formed by injection molding.

12. The integrated multi-way valve according to claim 1, wherein the mounting panel and the valve seat are integrally formed by injection molding.

13. A vehicle thermal management system, comprising the integrated multi-way valve according to claim 1.

14. The vehicle thermal management system according to claim 13, wherein:
 a rotary shaft is provided for the valve cartridge and located on a central axis of the valve cartridge; and
 the driving assembly comprises:
 a motor; and
 a transmission mechanism connected to an output shaft of the motor and the rotary shaft, the transmission mechanism being configured to transmit power output from the output shaft of the motor to the rotary shaft to drive the valve cartridge to rotate.

15. The vehicle thermal management system according to claim 14, wherein the transmission mechanism comprises:
 a first bevel gear connected to the output shaft of the motor;
 a second bevel gear engaged with the first bevel gear; and
 a fourth gear connected to the rotary shaft.

16. The vehicle thermal management system according to claim 13, wherein:
 the mounting panel is of a flat plate shape; and
 N channels are defined on a side of the mounting panel facing towards the valve seat, each of the N channels extending to a corresponding one of the N openings from a corresponding one of the N channel interfaces to communicate the corresponding channel interface with the corresponding opening.

17. The vehicle thermal management system according to claim 13, wherein the predetermined angle is equal to 90°.

* * * * *